US008891217B2

(12) United States Patent
Bucsa et al.

(10) Patent No.: US 8,891,217 B2
(45) Date of Patent: Nov. 18, 2014

(54) INPUT/OUTPUT INTERFACE CIRCUIT WITH OVERPOWER PROTECTION

(71) Applicant: Tyco Safety Products Canada Ltd., Concord (CA)

(72) Inventors: Andrei Bucsa, Toronto (CA); Aurel Cojocaru, Mississauga (CA)

(73) Assignee: Tyco Safety Products Canada Ltd., Concord (CA)

( * ) Notice: Subject to any disclaimer, the term of this patent is extended or adjusted under 35 U.S.C. 154(b) by 30 days.

(21) Appl. No.: 13/632,678

(22) Filed: Oct. 1, 2012

(65) Prior Publication Data

US 2013/0194709 A1    Aug. 1, 2013

Related U.S. Application Data

(60) Provisional application No. 61/591,368, filed on Jan. 27, 2012.

(51) Int. Cl.
*H02H 3/00* (2006.01)

(52) U.S. Cl.
USPC ............................................. 361/86; 361/87

(58) Field of Classification Search
USPC ............................................. 361/86, 87, 100
See application file for complete search history.

(56) References Cited

U.S. PATENT DOCUMENTS

| 4,860,154 A | 8/1989 | Fazlollahi |
| 4,881,058 A | 11/1989 | Berry, III |
| 5,565,806 A | 10/1996 | Cordini et al. |
| 5,978,195 A * | 11/1999 | Goder et al. ................... 361/94 |
| 6,031,743 A * | 2/2000 | Carpenter et al. .............. 363/65 |
| 6,218,863 B1 | 4/2001 | Hsu et al. |
| 7,859,406 B2 | 12/2010 | Fosty et al. |
| 8,416,546 B2 * | 4/2013 | Arndt et al. ................... 361/86 |

FOREIGN PATENT DOCUMENTS

WO    WO 2011/096951 A1    8/2011

OTHER PUBLICATIONS

Patent Cooperation Treaty, International Search Report, mailed Feb. 20, 2013, for International Application No. PCT/CA2013/000045.

* cited by examiner

*Primary Examiner* — Danny Nguyen (57) ABSTRACT

An interface circuit configurable in input and output modes comprises a current source; an input/output node; a diode to prevent current from flowing from the input/output node to the current source; a first switch to short-circuit the diode when closed; and a second switch to form a ground path from the input/output node when closed. In input mode, the first switch is closed and the state of a connected sensor circuit may be measured. In the output mode, the first switch is open, and the second switch may be closed to activate an output circuit. In the output mode, power dissipation may be monitored, and the diode may protect the current source and measurement node from current flowing through the output circuit. In the input mode, closing the first switch may prevent the diode from introducing measurement errors due to nonlinear attenuation of perturbative AC signals.

23 Claims, 6 Drawing Sheets

INPUT/OUTPUT INTERFACE CIRCUIT WITH OVERPOWER PROTECTION

CROSS-REFERENCE TO RELATED APPLICATIONS

The present application claims priority from U.S. Provisional Patent Application No. 61/591,368, filed Jan. 27, 2012, the contents of which are hereby incorporated by reference.

FIELD OF THE INVENTION

The present invention relates to input/output circuits, and particularly to security system input/output interfaces.

BACKGROUND OF THE INVENTION

Security systems typically include a control panel with input/output interface circuits for connection to one or more sensor circuits and one or more output circuits. Each sensor circuit may include a plurality of sensors, each to detect a different alarm condition. Possible alarm conditions include opening of doors, excessive temperatures, detection of motion, and the like. Each output circuit may include one or more output devices to be activated on the occurrence of certain conditions. Possible output devices may include lamps, relays, strobes and the like. Each sensor circuit is connected to an input interface circuit, which measures parameters of the sensor circuit. Each output circuit is connected to an output interface circuit, which controls operation of any output devices on the output circuit.

Input and output requirements may vary from system to system, depending on system configuration, and particularly on the number of sensors and the number of output devices. Some systems may have a large number of sensor circuits, requiring a large number of input interfaces, but relatively few output devices. Other systems may have relatively few sensors, but numerous output devices such as lamps, relays, strobes and the like.

Given the variability of security system configurations, some security system panels include input/output interface circuits which are capable of functioning in both input and output modes.

Unfortunately, connection to an output circuit may cause damage to components of an interface. As a result, in conventional interfaces, components must be isolated in output mode. Unfortunately, some techniques for isolating components in output mode may introduce measurement errors in input mode. In addition, over-power conditions can cause damage to interface components.

Accordingly, there is a need for improved I/O interfaces which can be easily configured in either an input or an output mode, and which have protection against damage from over-power conditions.

SUMMARY OF THE INVENTION

In accordance with an aspect of the disclosure, an input/output interface circuit comprises a source of electrical current; an input/output node; a diode connected between the current source and the input/output node to prevent current from flowing from the input/output node to the current source; a first switch interconnected to substantially short circuit the diode when closed; a second switch interconnected to form a conductive path from the input/output node to ground, when closed.

The input/input circuit is configurable in a first, input mode wherein the first switch is closed, and a signal at the measurement node may be used to measure the state of a sensor circuit interconnected to the input/output node. The input/output interface circuit is further configurable in a second, output mode wherein the first switch is open, and the second switch may be closed to allow current to flow from an interconnected output circuit through the input/output node and the second switch to ground, thereby activating the output circuit.

Conveniently, in the output mode, a signal at the measurement node may be used to monitor power dissipation, and the diode may protect the current source and measurement node from current flowing through the output circuit. In the input mode, shorting the diode by closing the first switch may avoid measurement errors due to the diode's non-linear attenuation of perturbations in the form of AC signals.

In accordance with an aspect of the present invention, there is provided an input/output interface circuit operable in first and second modes, comprising: a source of electrical current; an input/output node; a diode connected between the current source, and the input/output node to prevent current from flowing through the input/output node into the current source; a first switch interconnected to substantially short circuit the diode, when closed; a second switch interconnected to form a conductive path from the input/output node to ground, when closed; a measurement node, between the current source and the diode, for measuring a voltage at the input/output node; wherein in the first mode, the first switch is closed and the second switch is open; and in the second mode, the first switch is open and the second switch may be selectively opened or closed.

In accordance with another aspect, there is provided an input/output interface circuit for a security system, comprising: a conductive path from a source of electrical current to ground; an input/output node in the conductive path for providing current to a sensor circuit in an input mode of the input/output interface and for receiving current from an output circuit in an output mode of the input/output interface; a diode interposed in the conductive path between the source of electrical current and the input/output node, the diode preventing current from flowing through the input/output node to the source of electrical current; an output switch interposed in the conductive path between the input/output node and ground; a mode switch, operable to substantially short-circuit the diode in the conductive path, thereby converting the input/output interface circuit from the output mode, in which a voltage at the anode of the diode is indicative of power dissipated by the output switch, to the input mode, in which a voltage at the anode of the diode is indicative of a voltage drop in the sensor circuit.

In accordance with yet another aspect, there is provided an input/output interface circuit for a security system, comprising: a source of electrical current; an input/output node for providing current to a sensor circuit in an input mode of the input/output interface and for receiving current from an output circuit in an output mode of the input/output interface; a first conductive path between the source of electrical current and the input/output node, the conductive path passing through a diode, the diode preventing current from flowing through the input/output node to the source of electrical current; a second conductive path from the input/output node to ground, the second conductive path passing through an output switch; a voltage output terminal in the first conductive path between the source of electrical current and the diode; a mode switch for substantially short-circuiting the diode in said first current path; wherein, in the input mode, the mode switch is closed and the voltage output terminal provides a signal indicative of a voltage drop in the sensor circuit, and in the output mode, the mode switch is open, and the voltage output terminal provides a signal indicative of power dissipated by the output switch when the output switch is closed.

In accordance with yet another aspect, there is provided a method of selectively operating an input/output (I/O) interface circuit comprising a current source, an I/O node, and a measurement node between the current source and the I/O node in one of an input mode and an output mode, wherein the operating comprises: in the input mode: supplying electrical current from the current source to a variable-resistance input circuit through the I/O node; and measuring the resistance of the input circuit by measuring the voltage at the measurement node; and in the output mode: interposing a diode between the I/O node and the measurement node to prevent current from flowing from the I/O node to the measurement node; actuating an output circuit interconnected with the I/O node by selectively closing an output switch to form a conductive path from the output circuit to ground through the I/O node and the output switch.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate by way of example only, embodiments of this invention.

DETAILED DESCRIPTION

Figure 1:
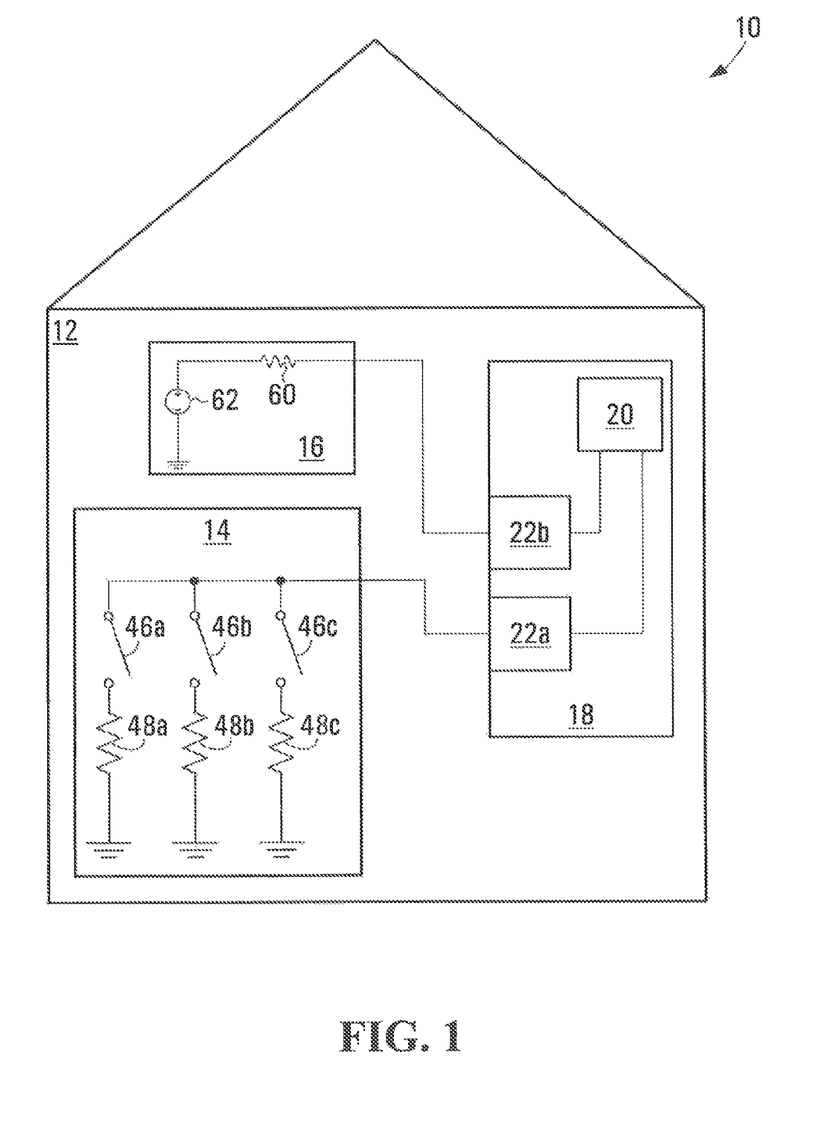
FIG. 1 is a schematic view of a security system.

FIG. 1 depicts a security system 10, exemplary of an embodiment of the present invention. Security system 10 is installed at a premises 12 and includes a panel 18, interconnected with at least one input circuit, such as a sensor circuit 14 and an output circuit 16. Sensor circuit 14 and output circuit 16 are interconnected to panel 18, by way of input output (I/O) interface circuits 22a, 22b (individually and collectively, I/O interface circuits 22), exemplary of embodiments of the present invention.

Panel 18 further includes a processing unit 20, connected to I/O interface circuits 22. Processing unit 20 may be a conventional programmable controller or processor having multiple I/O pins each for receiving an analog input, or providing an analog or digital output to an interconnected I/O interface circuit 22. Processing unit 20 may include, or be associated with suitable combination of persistent and random access memory to allow processing unit to be programmed to operate as described herein. Further, processing unit 20 may include one or more analog to digital converters (ADC) for sampling analog signals provided by I/O interface circuits 22. Processing unit 20 may be a processing unit dedicated to input/output, or may for part of another processor used to control the overall operation of panel 18.

Sensor circuit 14 includes at least one sensor and has a plurality of resistive states, each of which corresponds to a particular status of sensor circuit 14, for example, a particular sensed condition. Resistive states may correspond to, for example, TAMPER, ALARM, RESTORE, ANTIMASKING and other states of sensor circuit 14. Resistors 48a, 48b, 48c (individually and collectively, resistors 48) represent the resistive states of sensor circuit 14 and are in series with switches 46a, 46b, 46c (individually and collectively, switches 46), that may open or close in response to a sensed condition, such as, for example, an opened door or window, the presence of smoke, motion or the like. For example, sensor circuit 14 may include an open door sensor, and may cause resistor 44a to be switched into sensor circuit 14 when an associated door is opened. As required, sensor circuit 14 may include further components (not shown) to detect and react to a particular sensed condition. Conveniently, a single sensor circuit 14 may interconnect several sensors to panel 18. Resistances of resistors 48a, 48b, 48c may be different, and may be selected such that each permutation of tripped sensors in sensor circuit 14 yields a different total resistance, that may be sensed at panel 18. The total resistance of sensor circuit 14 is therefore indicative of which sensors on sensor circuit 14 are activated. Thus, the total resistance of sensor circuit 14 can be used by panel 18 to identify the existence of alarm conditions.

As required, panel 18 may include multiple input interface circuits, like I/O interface circuit 22a, with each input interface feeding one or multiple sensors in a sensing circuit, like sensor circuit 14.

Output circuit 16, by contrast, typically includes an electrical load 60 that is actuated by panel 18. Output circuit 16, may for example, include an output device, such as an audio transducer, or piezo; a light; a relay; or the like. Load 60 represents such a device. Load 60 may be powered under control of panel 18. Output circuit 16 may include its own source of electrical power, in the form of power source 62. As such, power to load 60 need not be provided by panel 18, but provision may be controlled by panel 18. An output device may be activated by panel 18, for example, upon the detection of a particular condition by security system 10. For example, panel 18 may actuate a lamp to be turned on if a particular sensor is tripped. Alternatively, panel 18 may switch a relay which controls a thermostat, or may cause an overhead door to close when a sensor is tripped. Each one of sensor circuit 14 and output circuit 16 is connected to an I/O interface circuit 22 on panel 18. Each I/O interface circuit 22 may interconnect multiple sensor circuits 14 or output circuits 16 to a zone within premises 12. As will be appreciated, a control panel 18 may include unequal numbers of I/O interface circuits 22 configured for input and output.

Conveniently, to provide flexibility, each I/O interface circuit 22 may be configured in either an input mode or an output mode. Sensor circuits, in turn, are connected to an I/O interface circuit 22 configured in input mode, and output circuits are connected to an I/O interface circuit 22 configured in output mode. An I/O interface circuit 22 in input mode measures the voltage drop across an interconnected sensor circuit, so that the total resistance of the sensor circuit can be determined, and the state of the sensor identified. An I/O interface circuit 22 in output mode controls an interconnected output circuit. Specifically, an I/O interface circuit 22 in output mode may selectively activate an output device in an interconnected output circuit 16 by providing a path to ground from a power supply through the load 60.

As noted, depicted control panel 18 includes at least two such I/O interface circuits 22a and 22b (only two are depicted). However, a typical panel 18 may include an arbitrary number of such interfaces (e.g. 1, 8, 16 or 32, or more).

I/O interface circuit 22a is configured in input mode and is connected to sensor circuit 14. I/O interface circuit 22b is configured in output mode and is connected to output circuit 16. So configured, I/O interface circuit 22a provides current to sensor circuit 14, which produces a signal indicative of the voltage at I/O node 24. This signal is provided to processing unit 20, which may use the signal to determine the resistance of sensor circuit 14, and in turn the status of sensor circuit 14 and therefore, if an alarm condition exists.

I/O interface circuit 22b, configured in output mode, may provide a ground path for output circuit 16, and therefore may receive current from output circuit 16 and cause any devices on output circuit 16 to be activated. I/O interface circuit 22b may also provide a signal to processing unit 20, using which processing unit 20 can monitor for overpower conditions.

Figure 2:
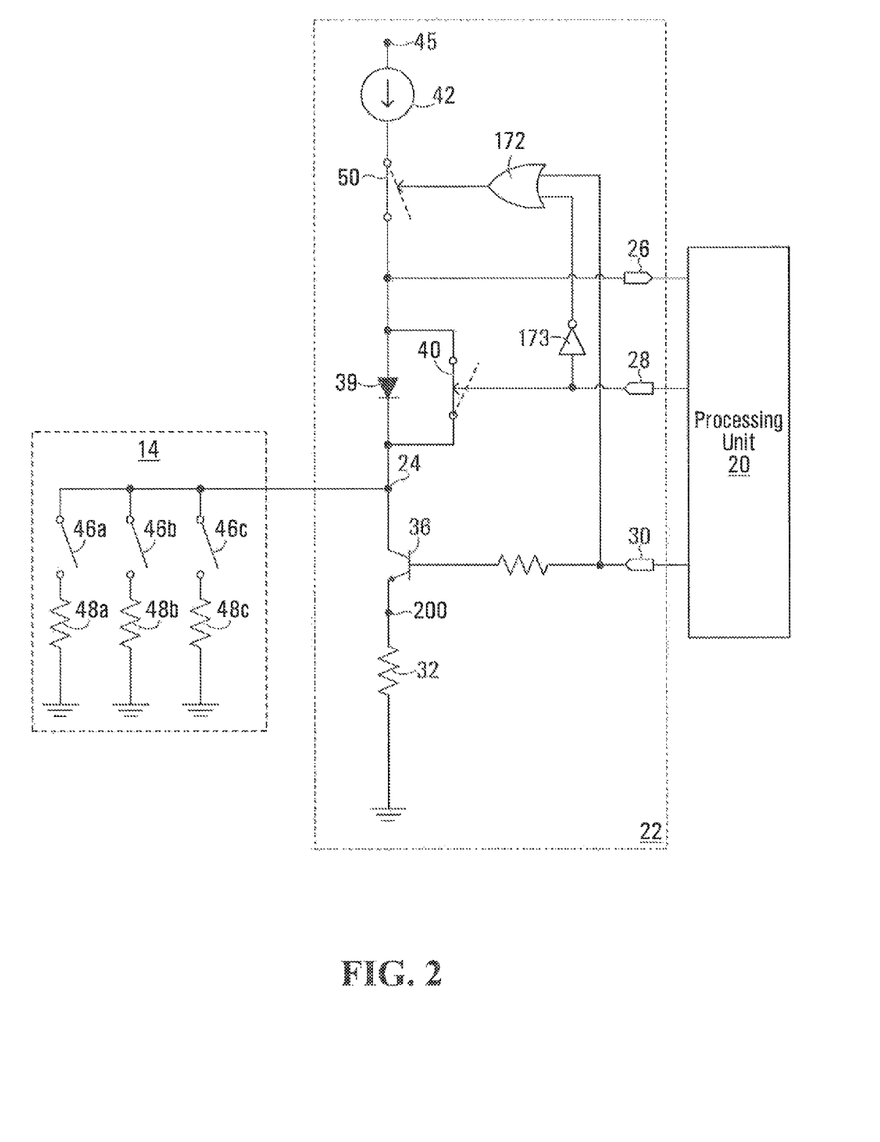
FIG. 2 is a schematic view of an input/output interface circuit of FIG. 1, in a first configuration.

An exemplary I/O interface circuit 22 is depicted in FIG. 2. As illustrated, I/O interface circuit 22 includes a current source 42 connected to a reference voltage at node 45. The reference voltage may be, for example, 3.3V. As will become apparent, when I/O interface circuit 22 is configured for input, current source 42 may provide current to sensor circuit 14, and when I/O interface circuit 22 is configured for output, current source 42 biases other components of I/O interface circuit 22.

Within I/O interface circuit 22, current source 42 is connected by way of a switch 50 to the anode of a diode 39, with the cathode of diode 39 being connected to an input/output (I/O) node 24. Thus, diode 39 forms part of a conductive path from current source 42 to I/O node 24 and blocks reverse flow of current from I/O node 24 into current source 42. An output node 26 lies between current source 42 and I/O node 24. Output node 26 is for measuring signals and provides a voltage signal to a processing unit 20.

A mode switch 40 is connected in parallel with diode 39. Mode switch 40 is controlled by a control signal received at input 28 from processing unit 20, and may be used to configure I/O interface circuit 22 for input or output. Mode switch 40 is a normally-closed switch. However, in other embodiments, mode switch 40 may be normally open. I/O interface circuit 22 also includes an output transistor 36, which lies in a conductive path from I/O node 24 to ground. Output transistor 36 is controlled by a control signal received at input 28 from processing unit 20. Output transistor 36 may be an npn-type bipolar junction transistor (BST), and is normally OFF. In some embodiments, output transistor 36 may instead be formed as a MOSFET or IGBT. I/O interface circuit 22 may further comprise a negative feedback resistor 32 connected between the emitter of output transistor 36 and ground. Inputs 28 and 30 also control current source 42 by way of OR logic 172 and switch 50. That is, the signals from inputs 28, 30 are passed to OR logic 172, with the signal from input 28 first passing through inverter logic 173. The output of OR logic 172 controls switch 50, turning current source 42 ON or OFF.

I/O interface circuit 22 may therefore define a conductive path from current source 42 to ground by way of output node 26, diode 39, I/O node 24, output transistor 36 and resistor 32. Diode 39 is interposed in the path between current source 42 and I/O node 24. Output transistor 36 is interposed in the path between I/O node 24 and ground, and may selectively form or break the path to ground by turning ON or OFF.

As noted, configuration of I/O interface circuit 22 in either input or output mode may be achieved by a control signal provided to mode switch 40. In FIG. 2, I/O interface circuit 22 is in input mode. In input mode, the control signal on input 28 is LOW logic. Mode switch 40 is closed, short-circuiting diode 39. The LOW signal on input 28 also activates current source 42 by way of inverter logic 173, OR logic 172 and switch 50. The signal on input 30 is kept LOW. Thus, output transistor 36 is open.

I/O interface circuit 22, in input mode, is connected to a sensor circuit 14. Current flows from current source 42, through closed mode switch 40 to I/O node 24 and into sensor circuit 14.

Output node 26 provides a voltage signal to processing unit 20. The voltage signal corresponds to the voltage at I/O node 24, plus any voltage drop across mode switch 40. As current source 42 produces a substantially constant current, the voltage drop across mode switch 40 may also be substantially constant. Processing unit 20 may use the sampled voltage at output node 26 to determine the voltage applied to sensor circuit 14 by subtracting the voltage drop across mode switch 40. The total resistance of sensor circuit 14 may thus be determined from this voltage measurement. Based on the total resistance, processing unit 20 may determine the status of sensor circuit 14, and therefore, which alarm conditions exist. Of course, it is not necessary for processing unit 20 to explicitly calculate the total resistance based on the measured voltage drop. Instead, processing unit 20 may be under program control to determine the existence of alarm conditions directly from the measured voltage drop.

Typically, the voltage drop across mode switch 40 is very small relative to the voltage drop in sensor circuit 14. As such, processing unit 20 may ignore the voltage drop across mode switch 40. That is, it may approximate the voltage drop in sensor circuit 14 to be the measured voltage.

Current source 42 produces a DC current, however sensor circuit 14 may be susceptible to AC perturbations. AC perturbations may occur, for example, when AC lines come in contact with security system wiring. This may happen, for example, if an intrusion is attempted. Accordingly, to estimate the DC voltage at output node 26, processing unit 20 may apply AC rejection techniques such as averaging, e.g. over multiple perturbation periods, or analog or digital filtering in order to determine a DC voltage at output node 26. Mode switch 40 is closed in input mode to short-circuit diode 39, because of the non-linear AC blocking characteristics of diode 39. If a current with an AC perturbation flowed backward through diode 39 to output node 26, the combination of nonlinear attenuation in diode 39 and AC rejection techniques in processing unit 20 could produce errors in the estimated DC voltage and therefore, erroneous determination of the status of sensor circuit 14.

Figure 3:
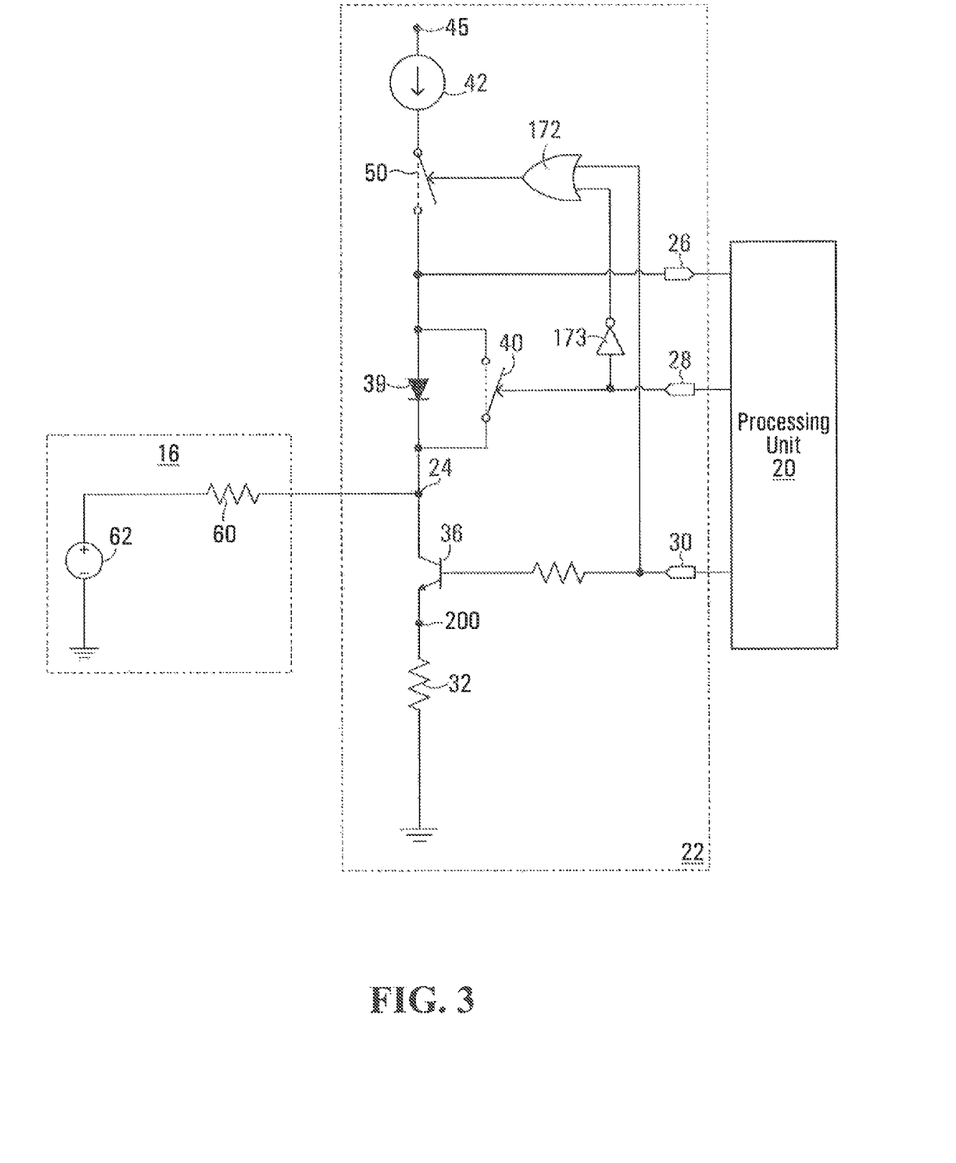
FIG. 3 is a schematic view of the input/output interface circuit of FIG. 2, in a second configuration.

FIG. 3 depicts I/O interface circuit 22 configured in output mode. Configuration in output mode is achieved by control of mode switch 40 via the signal received at input 28. In output mode, the signal at input 28 is HIGH logic. Mode switch 40 is open. The control signal at input 30 may be either HIGH or LOW logic. When the input 30 is HIGH, output transistor 36 is turned ON and switch 50 is closed. When input 30 is LOW, output transistor 36 is turned OFF and switch 50 is open.

I/O node 24 may be interconnected with output circuit 16. When connected, and when output transistor 36 is turned ON, a conductive path to ground runs from power source 62 of output circuit 16 through load 60, and passes through I/O node 24, output transistor 36 and resistor 32. When output transistor 36 is OFF, the path to ground is interrupted and current does not flow from power source 62 through load 60. In this state, voltage at I/O node 24 floats. When output transistor 36 is ON, current flows from power source 62 to ground through load 60, I/O node 24, output transistor 36 and resistor 32. Output transistor 36 therefore controls output circuit 16. When output transistor 36 is ON, the output device associated with load 60 is activated. When output transistor 36 is OFF, the output device is inactive.

As the control signal at input 30 controls output transistor 36, it likewise controls output circuit 16. Processing unit 20 may determine when it is desired to activate the device associated with load 60, such as when a particular condition is detected.

When output transistor 36 is OFF, the voltage at I/O node 24 floats based on the voltage produced by power source 62. The voltage produced by power supply 62 may be higher than the voltage at node 45 and high enough to cause damage to current source 42 and/or to processing unit 20 via output node 26. In addition, reverse current flow from I/O node 24 towards output node 26 and current source 42 could cause undesired activation of load 60. Accordingly, mode switch 40 is open when I/O interface circuit 22 is configured in output mode, so that diode 39 blocks flow of current from I/O node 24 toward output node 26 and current source 42.

When output transistor 36 is closed (ON), output circuit 16 is active, that is, current flows from power source 62 through load 60, to ground via output transistor 36 and resistor 32. As a result, power is dissipated by output transistor 36. The power dissipated is proportional to the collector current and the collector-emitter voltage drop.

As will be appreciated, output transistor 36 may be able to dissipate only a finite amount of power without damage. Under normal conditions, voltage at I/O node 24 may be very low and output transistor 36 may operate in saturation. Output transistor 36 may be selected such that it will not be damaged by the maximum current and voltage expected during this normal operation. However, overpower conditions could arise during operation of output circuit 16. For example, if load 60 becomes shorted, the voltage at I/O node 24 will increase. Accordingly, in the event of a short in output circuit 16, power dissipation at output transistor 36 will surge. Because resistor 32 acts as negative feedback, the collector current may reach the limiting current and output transistor 36 may shift from operating in saturation to operating in the active linear mode and acting as a current limiter. In this mode, as the base control voltage is constant, the emitter voltage at node 200, that is, the emitter voltage of output transistor 36, is likewise constant. In the event that the voltage at I/O node 24 increases, the collector-emitter voltage drop of output transistor may increase to maintain a constant voltage at node 200, and therefore, a constant collector current. As will be appreciated, with the collector current constant and collector-emitter voltage drop elevated, power dissipation of output transistor 36 is elevated and may be damaging.

To provide protection against damaging overpower, I/O interface circuit 22 allows for power dissipation to be monitored in output mode. To this end, when control input 30 goes HIGH, turning output transistor 36 ON and activating output circuit 16, a HIGH signal is provided from OR logic 172 to switch 50, causing switch 50 to close. Under normal conditions, when output transistor 36 is ON, the voltage at I/O node 24 is sufficiently low that current flows from current source 42 to ground through diode 39, output transistor 36 and resistor 32.

For a given current and a given temperature, a substantially constant voltage drop occurs across diode 39. As current source 42 produces a known constant current, the voltage drop may be programmed into processing unit 20. Thus, processing unit 20 may estimate the approximate voltage at I/O node 24 by subtracting the estimated voltage drop across diode 39 from the voltage measured at output node 26. The voltage drop across diode 39 could also be measured using the signal at output node 26 in a calibration mode, by turning output transistor 36 ON with mode switch 40 OFF and no circuit, or a known circuit connected to I/O node 24.

Processing unit 20 may also determine the state of output transistor 36. As noted, power dissipation on output transistor 36 is dependent on the product of collector current, which is constant in the case of overpower, and collector-emitter voltage drop. The voltage drop corresponds to the voltage at I/O node 24, which processing unit 20 may determine from the voltage measured at output node 26.

The resistance of load 60 will be large relative to that of output transistor 36 and resistor 32. Accordingly, under normal circumstances, the voltage at I/O node 24 may be relatively low, even if power source 62 produces a large voltage. However, under fault conditions, for example, if load 60 is substantially shorted, voltage at I/O node 24 may be elevated. In such circumstances, the collector-emitter voltage drop and power dissipated by output transistor 36 will increase. If voltage at I/O node 24 is above a certain threshold, it may be determined that output transistor 36 may not be operating in saturation and/or may be exposed to possibly damaging overpower conditions and may be acting as a current limiter.

Accordingly, processing unit 20 may periodically or continuously monitor the approximate power dissipated by output transistor 36 using the approximated voltage at I/O node 24, which as noted above, may be used to determine the power dissipation on output transistor 36 for a known current. As will be appreciated, the limiting current may be known and is determined by the resistance of a resistor biasing the base of output transistor 36, the control voltage presented at input 30 and the resistance of resistor 32. If the measured voltage is indicative of excess power dissipation on output transistor 36, processing unit 20 may cause the signal on input 30 to go LOW, opening output transistor 36 and interrupting its dissipation of power.

Figure 4:
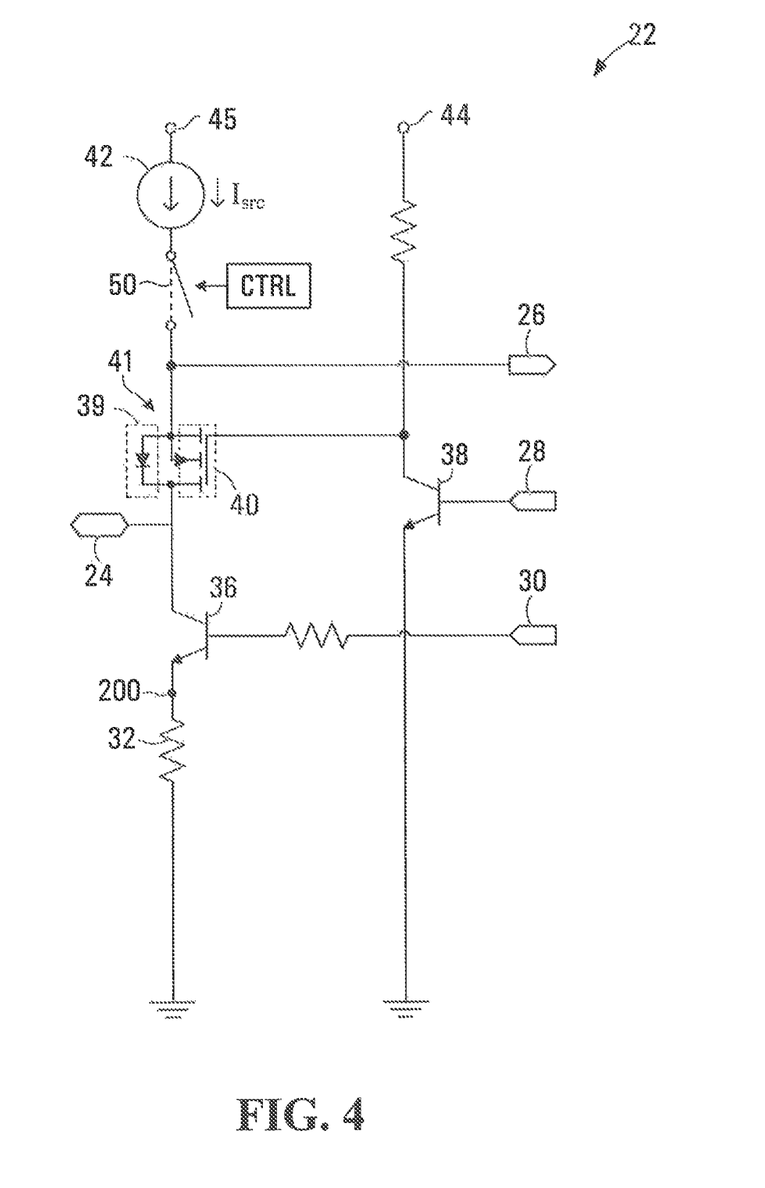
FIG. 4 is a detailed schematic view of he input/output interface circuit of FIGS. 2-3.

As depicted in FIG. 4, mode switch 40 may be formed as an n-type power MOSFET 41. Conveniently, diode 39 may be formed as the internal parasitic drain to source junction (body diode) of MOSFET 41.

MOSFET 41, acting as a switch is controlled by a reference voltage at node 44, connected to the collector of a transistor 38, which is in turn operated by a control signal at input 28. Specifically, when input 28 receives a LOW signal, transistor 38 is OFF and a high voltage from node 44 is presented at the gate of mode MOSFET 41, turning it ON, because the gate voltage exceeds the source voltage. When input 28 receives a HIGH signal, transistor 38 is ON and the voltage at the gate of MOSFET 41 is pulled to ground, turning it OFF. The reference voltage at node 44 may be, for example, approximately 12V and is sufficiently high to present a voltage to the gate of MOSFET 41 that is higher than the sum of the voltage at node 45 and the maximum gate threshold voltage of MOSFET 41.

Output transistor 36 is operated by a control signal at input 30 and is ON when the control signal is HIGH and OFF when the control signal is LOW.

In input mode of I/O interface circuit 22 (with LOW input signals at control input 28 and control input 30), MOSFET 41 is ON and output transistor 36 is OFF. Current source 42 is also ON and a constant current flows from current source 42 through the channel of MOSFET 41 to I/O node 24 which may be connected to a sensor circuit (like sensor circuit 14). Output node 26 provides a voltage signal that may feed a processing unit (like processing unit 20), and which corresponds to the total voltage drop across the source to drain of MOSFET 41 and the interconnected sensor circuit. As current source 42 produces a substantially constant current, the voltage drop across MOSFET 41 will also be substantially constant, allowing the sensor circuit voltage drop to be determined by subtracting the voltage drop across MOSFET 41 from the voltage measured at output node 26.

In output mode, a HIGH signal is received at input 28, turning MOSFET 41 OFF. I/O node. 24 may be connected to an output circuit like output circuit 16. A conductive path from the output circuit to ground may be selectively established by turning output transistor 36 ON and OFF. More specifically, when output transistor 36 is OFF, the path to ground is interrupted. When output transistor 36 is turned ON, current flows from the output circuit to ground through I/O node 24, output transistor 36 and resistor 32. As MOSFET 41 is off, diode 39 protects current source 42 and output node 26 and allows I/O node 24 to float when transistor 36 is turned OFF.

A processing unit may further monitor power dissipation on output transistor 36 using voltage output node 26. To this end, current source 42 is active in the output mode when output transistor 36 is ON. Under normal conditions, current flows from current source 42 to I/O node 24 through diode 39. A constant voltage drop occurs across diode 39. The voltage signal from output node 26 may be used to estimate the approximate collector voltage of output transistor 36 by subtracting the estimated voltage drop across diode 39. The processing unit may then determine the approximate power dissipation on output transistor 36 substantially as described above and in the event of excessive power dissipation, may cause the signal on input 30 to go LOW, turning output transistor 36 OFF and interrupting its dissipation of power.

Of course, it is not necessary to explicitly calculate the approximate power dissipation on output transistor 36. Instead, a processing unit may be programmed to cause the signal on input 30 to go LOW when the voltage received from output node 26 crosses a certain threshold.

Figure 5:
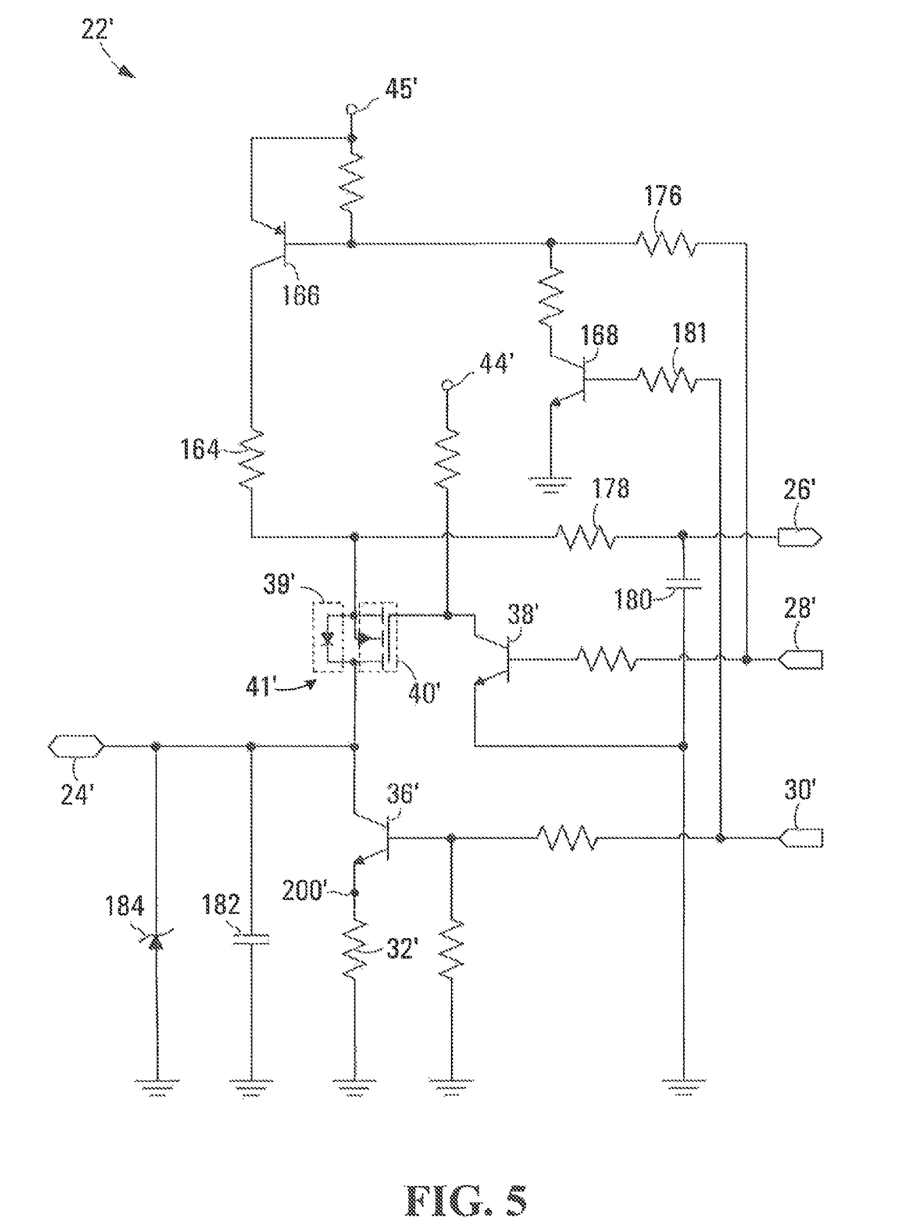
FIG. 5 is a schematic view of another input/output interface circuit.

FIG. 5 depicts a further embodiment of an I/O interface circuit 22'. Components of I/O interface circuit 22' which are the same as components of I/O interface circuit 22 depicted in FIG. 4 are identified with the same numbers and a prime (') symbol. For example, I/O node 24' in FIG. 5 is the same as I/O node 24 in FIG. 4. These elements of I/O interface circuit 22' will not be described again in detail I/O interface circuit 22', includes a voltage source, rather than a current source. More specifically, I/O interface circuit 22' is connected to a reference voltage at node 45'. As in the embodiment of FIG. 4, mode switch 40' is formed as an n-type MOSFET 41', diode 39' is formed as the internal parasitic drain to source junction of MOSFET 41'. MOSFET 41' and output transistor 36' are controlled by input signals at inputs 28', 30' as in the embodiment of FIG. 4.

Node 45 is connected to I/O node 24' by way of a prep-type transistor 166, resistor 164, and MOSFET 41'. Transistor 166 is controlled by the control signal at input 28², a biasing resistor 176 and by npn-type transistor 168, which is in turn controlled by the control signal at input 30'. Specifically, transistor 166 is ON when input 28' receives a LOW input signal and OFF when input 28' receives a HIGH input signal. However, when a HIGH input signal is received on input 30' and passed to the base of transistor 168 via resistor 181, transistor 168 is turned ON, diverting current from the base of transistor 166 and turning it ON. In other words, transistor 166 is ON when input 28' receives a LOW signal or when input 30' receives a HIGH signal.

When I/O interface circuit 22' is configured in input mode, LOW input signals are received at control inputs 28', 30'. Transistor 38' is OFF. The reference voltage at node 44' is much higher than the reference voltage at node 45' and therefore biases MOSFET 41', turning it ON. Output transistor 36' is OFF. The LOW control signal at input 28' also turns transistor 166 ON, allowing flow of current from node 45' towards I/O node 24'.

Output node 26' may provide a signal that feeds a processing unit (like processing unit 20), which corresponds to the ratio between the total voltage drop across transistor 166, resistor 164, and the total voltage drop across MOSFET 41' and an interconnected sensor circuit. The difference between the sampled voltage and the reference voltage at node 45' is substantially equal to the voltage drop across transistor 166 and resistor 164. The resistance of resistor 164 may be very large, such that the voltage drop across transistor 166 and MOSFET 41' may be ignored. Resistor 164 and the interconnected sensor circuit act as a resistive voltage divider. The voltage sampled at output node 26' is a fraction of the reference voltage at node 45' and is indicative of the ratio of the resistance of the interconnected sensor circuit and the resistance of resistor 164. Again, the voltage drop in the sensor circuit may be determined from the voltage sampled at output node 26' and the known resistance of resistor 164.

In output mode, the signal at input 28' is HIGH, turning MOSFET 41' OFF. The HIGH signal at input 28' also turns transistor 166 OFF, preventing current flow from node 45' to I/O node 24'. However, as noted, transistor 168 may override this signal.

The control signal at input 30' may be either HIGH or LOW. When it is LOW, output transistor 36' is OFF, substantially preventing flow of current from I/O node 24' to ground. Voltage at I/O node 24' floats, while diode 39' prevents flow of current from I/O node 24' towards nodes 45' and 26'. Transistor 168 is also OFF. Transistor 166 is therefore turned OFF due to the signal on input 28'.

When it is desired to activate an interconnected output circuit, the control signal at input 30' goes HIGH. This turns output transistor 36' ON, allowing flow of current from I/O node 24' to ground. The HIGH signal on input 30' also turns ON transistor 168. This diverts current from the base of transistor 166, turning it on and allowing current to flow from node 45' towards I/O node 24' and ultimately, to ground through output transistor 36' and resistor 32'.

The voltage drop between output node 26' and I/O node 24' can be approximated as the voltage drop across parasitic diode 39'. Accordingly, from the voltage signal at output node 26', a processing unit may estimate the voltage at I/O node 24'. As noted, power dissipation on output transistor 36' is a function of its collector current, which, as noted, remains constant when output transistor 36' shifts from operating in the saturation state to operating in the linear state, and its collector voltage, that is, the voltage at I/O node 24'. Accordingly, if the measured voltage is indicative of a level of power dissipation that could damage output transistor 36', the processing unit may cause control signal 30' to go low, interrupting current flow to ground by way of output transistor 36'.

I/O interface circuit 22' also includes a resistor 178 and capacitor 180 which together form an ADO anti-alias filter interconnected with output node 26'. A capacitor 182 and a transient voltage suppressing (TVS) diode 184 connected between I/O node 24' and ground to provide protection against electrostatic discharge.

Figure 6:
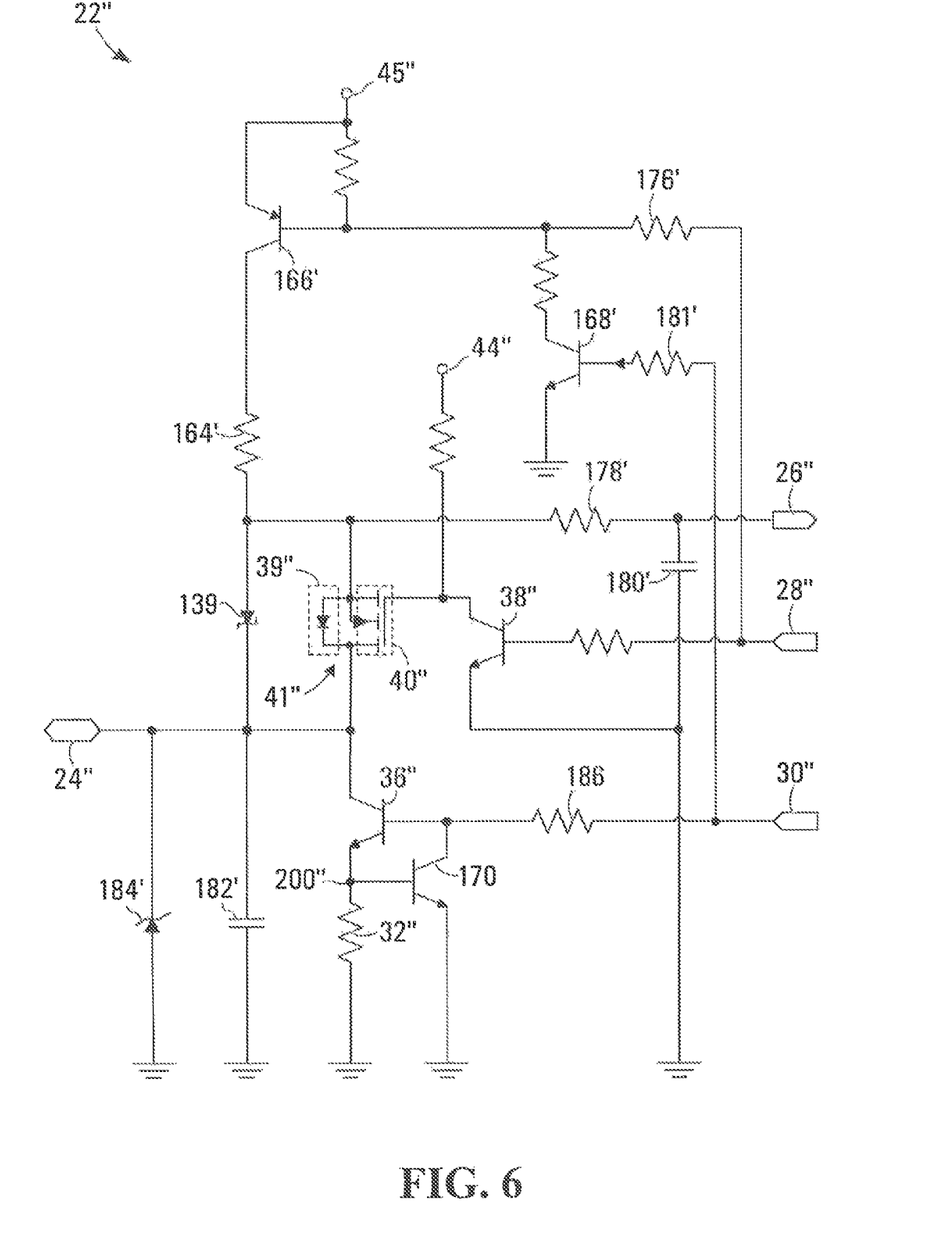
FIG. 6 is a schematic view of another input/output interface circuit.

FIG. 6. depicts a further embodiment of an I/O interface circuit 22" which includes an additional Schottky diode 139 and an additional npn-type transistor 170. Components of I/O interface circuit 22" which are the same as components of I/O interface circuit 22 depicted in FIG. 4 are identified with the same numbers and a double-prime (") symbol. For example, I/O node 24" in FIG. 6 is the same as I/O node 24 in FIG. 4.

Components of I/O interface circuit 22" which are the same as components of I/O interface circuit 22' depicted in FIG. 5 are identified with the same numbers and a prime (') symbol. For example, transistor 168' in FIG. 6 is the same as I/O transistor 168 in FIG. 5. These elements of I/O interface circuit 22" will not be described again in detail.

Schottky diode 139 is connected in parallel with MOSFET 41" between resistor 164 and I/O node 24", with its anode connected to resistor 164' and its cathode connected to I/O node 24". Schottky diode 139 and diode 39" together block reverse current flow when MOSFET 41" is OFF. A voltage drop occurs across Schottky diode 139 in the output mode when output transistor 36" is ON. For a given current, the voltage drop across Schottky diode 139 may be smaller than the voltage drop that would occur across diode 39" alone. For example, in I/O interface circuit 22' of FIG. 5, the voltage drop across diode 39' may be approximately 0.65V. In I/O interface circuit 22", the voltage drop across the parallel combination of Schottky diode 139 and diode 39" may be approximately 0.22V. This smaller voltage drop may allow for a wider range of measurable voltages at I/O node 24" and therefore may widen the measurable range of power dissipation on output transistor 36". The collector of transistor 170 is connected with the base of output transistor 36", the base of transistor 170 is connected to the emitter of output transistor 36" at node 200", and the emitter of transistor 170 is connected to ground. The base of output transistor 36" is biased by applying a voltage through a biasing resistor 186, for example 3.3V, at input 30". For a low collector current of output transistor 36", the voltage at node 200" may be sufficiently low that output transistor 36" is saturated and the base of transistor 170 is unbiased. If the collector current of output transistor 36" increases, the emitter current may likewise increase, elevating the voltage at node 200". At a certain point, for example, when the voltage at node 200" reaches 0.65 V, transistor 170 may enter into conduction and act as a voltage divider with biasing resistor 186. Accordingly, the base voltage of output transistor 36" may decrease, causing it to switch from saturation to active linear mode and therefore causing the voltage at node 200" to remain constant, regardless of increasing voltage at I/O node 24". Constant voltage at node 200" corresponds to a constant current through resistor 32", that is, a constant emitter current of output transistor 36", and therefore, a constant collector current of output transistor 36". In this configuration, output transistor 36", resistor 32", transistor 170 and biasing resistor 186 together effectively function as a current limiter. That is, when the voltage at node 200" reaches a certain threshold, for example, 0.65 V, they work to keep the voltage at node 200" and the collector current of output transistor 36" substantially constant.

Variations to the above-described embodiments will be apparent to those of ordinary skill. For example, mode switch 40/MOSFET 41 may be replaced with a P-type MOSFET, with corresponding changes to the control signals. Also, to decrease the power dissipated on resistor 32", an operational amplifier could be used in place of transistor 170 could to limit the current through output transistor 36".

Conveniently, interface circuits 22/22'/22" may be configured and operated in input and output modes simply by selectively closing or opening mode switch 40/40'/40". While in output mode, output transistor 36/36'/36" may be selectively closed to form a ground path for an interconnected output circuit. Diode 39/39'/39" isolates components of I/O interface circuit 22/22'/22", thereby protecting them from damage, and preventing reverse current leakage, while allowing current to flow for monitoring power dissipation. While in input mode, the closing of mode switch 40/40'/40" bypasses the diode 39/39'/39" to prevent it from causing measurement errors.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed:

1. An input/output interface circuit operable in first and second modes, comprising:
   a source of electrical current;
   an input/output node;
   a diode connected between said current source, and said input/output node to prevent current from flowing through said input/output node into said current source;
   a first switch interconnected to substantially short circuit said diode, when closed;
   a second switch interconnected to form a conductive path from said input/output node to ground, when closed;
   a measurement node, between said current source and said diode, for measuring a voltage at said input/output node;
   wherein in said first mode, said first switch is closed and said second switch is open;
   and in said second mode, said first switch is open and said second switch may be selectively opened or closed;
   wherein said input/output node is for providing current to a sensor circuit in said first mode and for receiving current from an output circuit in said second mode.

2. The input/output interface circuit of claim 1, wherein in said first mode, a voltage signal indicative of a voltage drop in an interconnected sensor circuit is provided at said measurement node, and in said second mode, a voltage signal indicative of power dissipation on said second switch is provided at said measurement node.

3. The input/output interface circuit of claim 1, wherein said first switch is controlled by a first control signal received on a first input node and said second switch is controlled by a second control signal received on a second input node.

4. The input/output interface circuit of claim 3, wherein said source of electrical current is controlled by said first and second control signals, such that said source of electrical current supplies current when either one of said first switch and said second switch is closed.

5. The input/output interface circuit of claim 1, wherein said first switch comprises a MOSFET transistor.

6. The input/output interface circuit of claim 5, wherein said diode is connected in parallel with said MOSFET transistor.

7. The input/output interface circuit of claim 5, wherein said diode is internal to said MOSFET transistor.

8. The input/output interface circuit of claim 1, wherein said second switch comprises an output transistor.

9. The input/output interface circuit of claim 1, wherein said source of electrical current is a constant-current source.

10. The input/output interface circuit of claim 1, wherein said source of electrical current is a constant-voltage source connected to a resistor.

11. The input/output interface circuit of claim 8, further comprising a feedback switch interconnected with said output transistor, said feedback switch operable in response to an emitter voltage of said output transistor reaching a predetermined threshold to reduce the voltage at the base of said output transistor, thereby causing said output transistor to enter the active linear mode of operation.

12. The input/output interface circuit of claim 11, wherein said feedback switch comprises a feedback transistor, the base of said feedback transistor interconnected to the emitter of said output transistor, and wherein said reducing voltage comprises said feedback transistor acting as a voltage divider with a biasing resistor connected to the base of said output transistor.

13. An input/output panel comprising a plurality of input/output interface circuits in accordance with claim 1.

14. A security system comprising a plurality of input/output interface circuits in accordance with claim 1.

15. An input/output interface circuit for a security system, comprising:
- a conductive path from a source of electrical current to ground;
- an input/output node in said conductive path for providing current to a sensor circuit in an input mode of said input/output interface and for receiving current from an output circuit in an output mode of said input/output interface;
- a diode interposed in said conductive path between said source of electrical current and said input/output node, said diode preventing current from flowing through said input/output node to said source of electrical current;
- an output switch interposed in said conductive path between said input/output node and ground;
- a mode switch, operable to substantially short-circuit said diode in said conductive path, thereby converting said input/output interface circuit from said output mode, in which a voltage at the anode of said diode is indicative of power dissipated by said output switch, to said input mode, in which a voltage at the anode of said diode is indicative of a voltage drop in said sensor circuit.

16. An input/output interface circuit for a security system, comprising:
- a source of electrical current;
- an input/output node for providing current to a sensor circuit in an input mode of said input/output interface and for receiving current from an output circuit in an output mode of said input/output interface;
- a first conductive path between said source of electrical current and said input/output node, said conductive path passing through a diode, said diode preventing current from flowing through said input/output node to said source of electrical current;
- a second conductive path from said input/output node to ground, said second conductive path passing through an output switch;
- a voltage output terminal in said first conductive path between said source of electrical current and said diode;
- a mode switch for substantially short-circuiting said diode in said first current path;

wherein, in said input mode, said mode switch is closed and said voltage output terminal provides a signal indicative of a voltage drop in said sensor circuit, and in said output mode, said mode switch is open, and said voltage output terminal provides a signal indicative of power dissipated by said output switch when said output switch is closed.

17. A method of selectively operating an input/output (I/O) interface circuit comprising a current source, an I/O node, and a measurement node between said current source and said I/O node in one of an input mode and an output mode, wherein said operating comprises:
- in said input mode:
  - supplying electrical current from said current source to a variable-resistance input circuit through said I/O node; and
  - measuring the resistance of said input circuit by measuring the voltage at said measurement node;
- and in said output mode:
  - interposing a diode between said I/O node and said measurement node to prevent current from flowing from said I/O node to said measurement node;
  - actuating an output circuit interconnected with said I/O node by selectively closing an output switch to form a conductive path from said output circuit to ground through said I/O node and said output switch.

18. The method of claim 17, wherein said operating comprises, in said output mode, supplying electrical current from said current source to said I/O node through said diode, and measuring power dissipation at said output switch by measuring the voltage at said measurement node.

19. The method of claim 17, wherein said operating comprises, in said input mode, closing a mode switch to short-circuit said diode and, in said output mode, opening said mode switch to interpose said diode between said I/O node and said measurement node.

20. The method of claim 19, further comprising providing a first control signal to said mode switch to cause said mode switch to selectively open or close, and providing a second control signal to said output switch to cause said output switch to selectively open or close.

21. The method of claim 19, wherein said mode switch comprises a MOSFET.

22. The method of claim 17, wherein said output switch comprises an output transistor.

23. The method of claim 22, wherein said operating comprises, in said output mode, in response to said output transistor entering the active linear mode of operation, activating a feedback transistor to reduce voltage at the base of said output transistor.

* * * * *